United States Patent [19]

Nishida et al.

[11] Patent Number: 5,842,116
[45] Date of Patent: Nov. 24, 1998

[54] RADIO DEVICE EQUIPPED WITH A REPLACEABLE DISPLAY SECTION

[75] Inventors: Toshiichi Nishida; Shinichi Nakazato, both of Tokyo, Japan

[73] Assignee: NEC Corporation, Tokyo, Japan

[21] Appl. No.: 578,235

[22] Filed: Dec. 26, 1995

[30] Foreign Application Priority Data

Dec. 26, 1994 [JP] Japan .................................. 6-322629

[51] Int. Cl.⁶ .................................. H04B 1/38; H04B 1/06
[52] U.S. Cl. .................................. 455/90; 455/296; 455/345; 455/346; 455/351; 361/814
[58] Field of Search .................................. 455/90, 346, 345, 455/347, 348, 351, 74, 89; 379/58, 59, 428, 433, 440; 340/425.5, 426; 361/814

[56] References Cited

U.S. PATENT DOCUMENTS

| | | | |
|---|---|---|---|
| 4,131,851 | 12/1978 | Martiny et al. | 455/296 |
| 4,856,088 | 8/1989 | Oliwa et al. | 455/349 |
| 5,054,119 | 10/1991 | Rolland | 455/346 |
| 5,245,511 | 9/1993 | Watanabe | 455/346 |
| 5,434,753 | 7/1995 | Watanabe | 455/345 |
| 5,537,673 | 7/1996 | Nagashima et al. | 455/351 |

*Primary Examiner*—Donnie L. Crosland
*Attorney, Agent, or Firm*—Young & Thompson

[57] ABSTRACT

A radio device equipped with a display panel 1 which contains a display section 2 provided with a plurality of electrode terminals formed thereon. A side of the display panel 1 may be provided with a protruding section 4. The case 5 is provided with a guide section 6 for insertion of the display section 2. The display section 2 is inserted and held via the guide section 6. The guide section 6 is provided with connection terminals 7 formed thereon for connection with the electrode terminals 3 of the display section 2. The display section 2 may be removed by pulling out the protruding section 4 or directly holding and pulling out the display panel 1. This configuration allows easy replacement of failed display sections alone and thus results in reduced maintenance costs.

17 Claims, 7 Drawing Sheets

RADIO DEVICE EQUIPPED WITH A REPLACEABLE DISPLAY SECTION

BACKGROUND OF THE INVENTION

1. Field of the Invention

The present invention relates to a radio device, and more particularly to a radio device equipped with a replaceable display section.

2. Description of the Prior Art

Portable telephones and selective-calling receivers are equipped with information display sections for displaying telephone numbers and other messages, and the great majority of the information display sections are composed of liquid crystal display panels.

Portable telephones and selective-calling receivers equipped with information display sections according to the prior art, wherein the information display sections are connected to electronic circuit sections via wiring sections, have required configurations which do not allow easy replacement of the information display sections alone. The information display sections, however, may fail due to shock from the outside, and the glass plates may be broken in some cases. According to the prior art, since it is not easy to replace only the failed or broken information display sections, the electronic circuit sections and the wiring sections must actually be replaced. This results in the problem of increased maintenance costs.

SUMMARY OF THE INVENTION

It is an object of the present invention to provide a portable radio device which allows easy replacement of the information display section and reduces the maintenance cost.

In order to accomplish this object, the radio device according to the present invention is equipped with an information display section composed of a display panel and an electrode terminal. In addition, the radio device case is provided with a guide section for inserting and holding the above-mentioned display section which has connection terminals for connection with the electrode terminals of the above-mentioned display section when the display section is mounted in the device.

The information display section may be easily removed by pulling out a protruding section provided on the information display section, or alternatively by directly holding and pulling out the display panel in cases where part of the configuration of the case is modified.

BRIEF DESCRIPTION OF THE DRAWINGS

The above and other objects, features and advantages of the present invention will become apparent from the following detailed description when taken together with the accompanying drawings in which.

DETAILED DESCRIPTION OF THE PREFERRED EMBODIMENTS

Figure 1A:
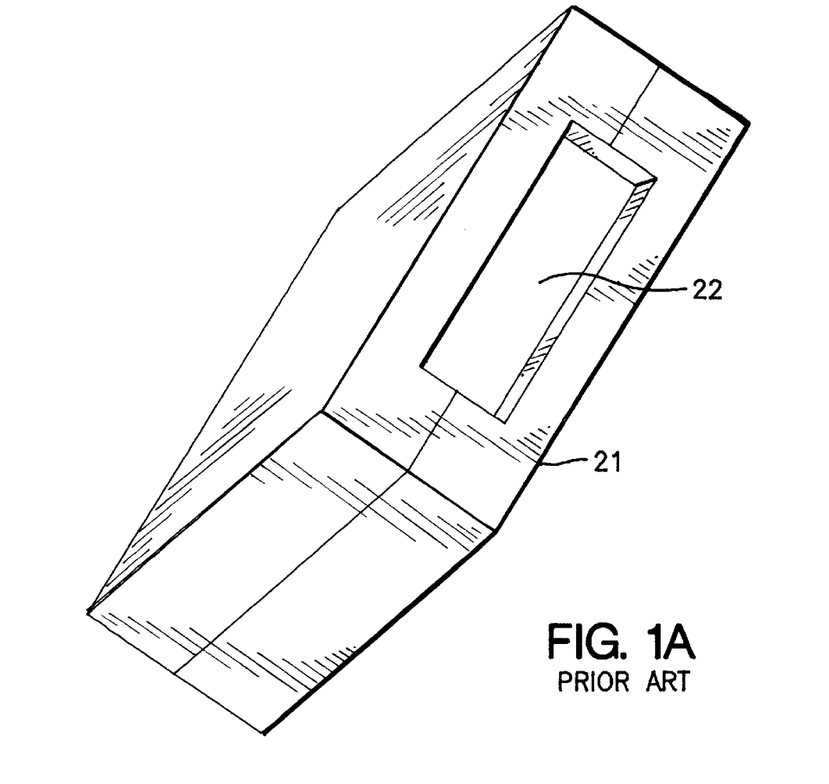
FIG. 1A is a perspective view illustrative of the outside of a radio device according to the prior art.
Figure 1B:
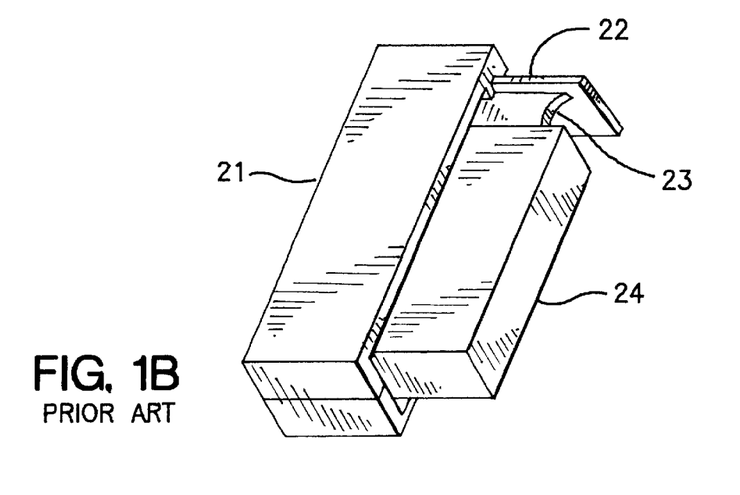
FIG. 1B is a partial fragmentary, perspective view of the radio device according to the prior art.

First, the configuration of a prior art portable radio device will be explained with reference to FIG. 1A and FIG. 1B. As shown in FIG. 1A, the prior art portable radio device is equipped with an information display section 22 mounted in a plastic case 21. The switch section, microphone, loudspeaker, etc. are omitted in these drawings. As shown in FIG. 1B, the information display section 22 is connected with an electronic circuit 24 via a wiring section 23 in the inside of the case 21. This connection is designed so as not to be easily disconnected.

An embodiment of the present invention will now be explained with reference to the drawings. This explanation applies to selective-calling receivers.

Figure 2:
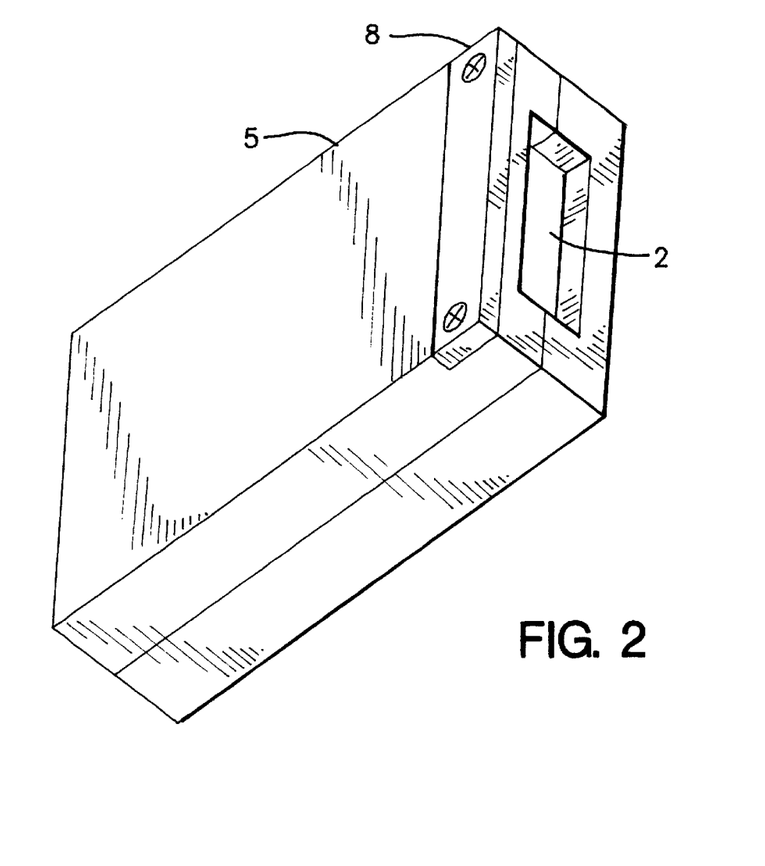
FIG. 2 is a perspective view illustrative of the outside of an selective-calling receiver according to an embodiment of the present invention.

FIG. 2 is a perspective view illustrative of the outside of an selective-calling receiver. This type of selective-calling receiver is equipped with an information display section 2 mounted in the top surface of a case 5, and with a cover 8 mounted on its side to protect a guide section for insertion of the information display section 2. In this drawing as well, the switch, loudspeaker, etc. are not shown for simplicity of explanation only.

Figure 3A:
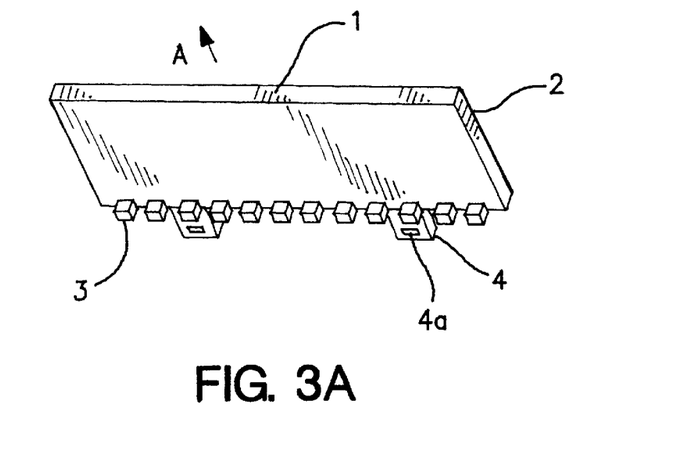
FIG. 3A, FIG. 3B, FIG. 3C and FIG. 3D are a perspective view, a side view, a plan view and a top view of the outside of the information display section of the selective-calling receiver shown in FIG. 2, respectively.
Figure 3B:
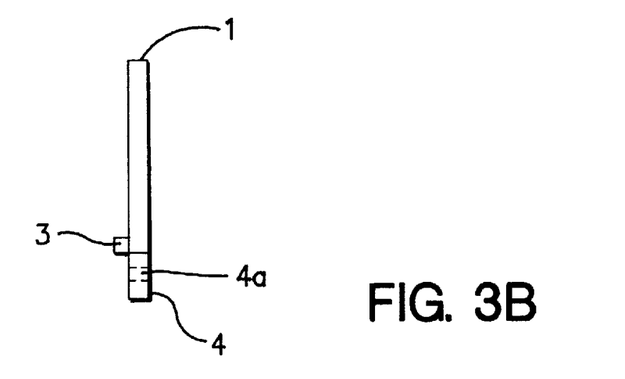
Figure 3C:
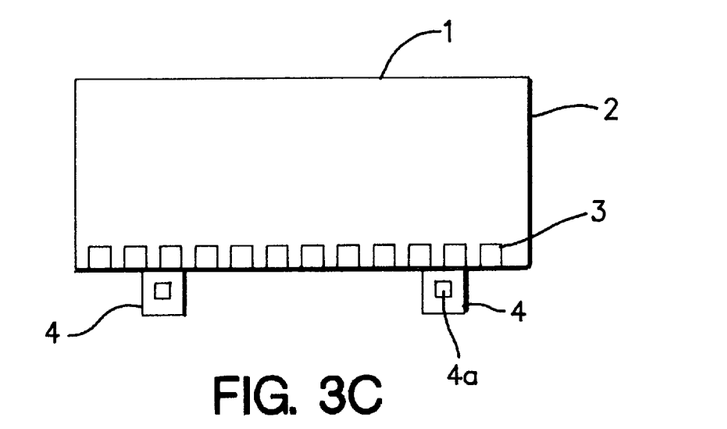
Figure 3D:
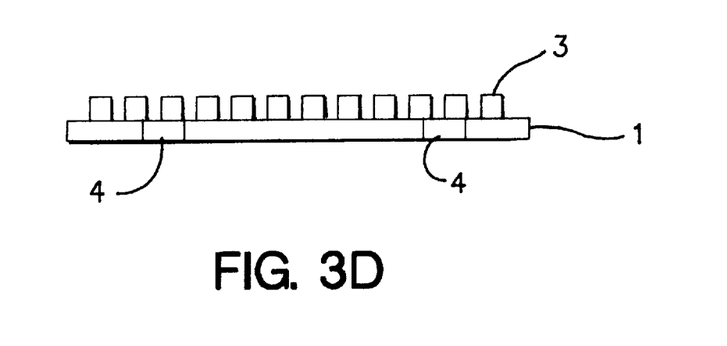

FIG. 3A, FIG. 3B, FIG. 3C and FIG. 3D illustrate the configuration of the information display section 2. A plurality of electrode terminals 3 are formed on the surface of a display panel 1 which is opposite its display surface, and two protruding sections 4 are provided on a side of the display panel 1. A liquid crystal display panel was used as the display panel 1 in the present embodiment. The number of electrode terminals 3 changes depending on the type of the selective-calling receiver, and sometimes amounts to approximately 20 to 30. The numbers of the protruding sections and the electrode terminals shown are only illustrative, and they may be present in any desired number including one. The liquid crystal display panel is constructed with a sealed configuration, wherein a glass plate and a transparent electrode sandwich a liquid crystal material. The protruding sections 4 are formed integrally with a resin frame provided along the periphery of the glass plate. In the drawings, a through-hole 4a is formed in each of the protruding sections 4 to facilitate dismounting of the information display section 2, though it is not a requisite. In FIGS. 3A though 3D, the electrode terminals 3 are each formed convexly near the side on which the protruding sections 4 of the display panel 1 are formed. In cases where the electrode terminals 8 are flat, however, they may even be formed in the center or on or near the opposite side of the display panel 1.

Figure 4A:
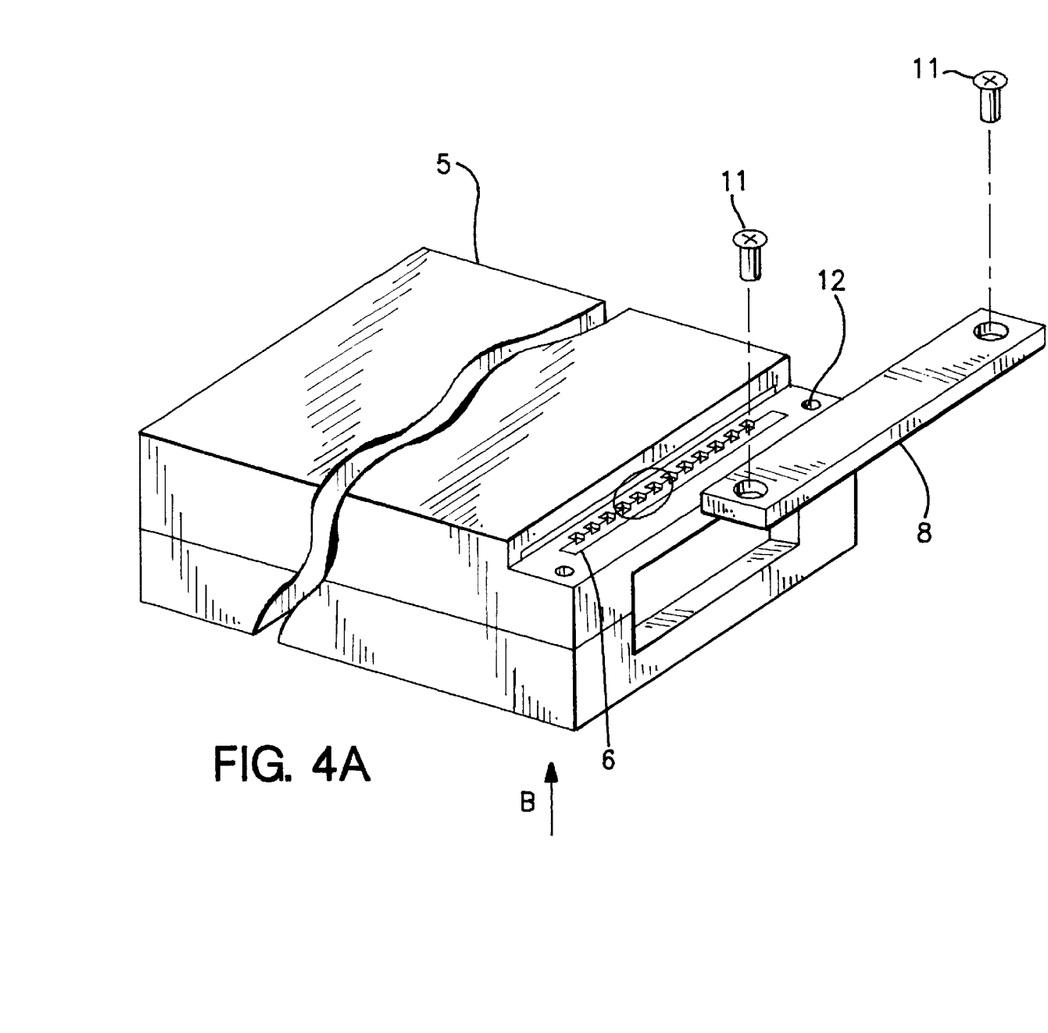
FIGS. 4A, FIG. 4B and FIG. 4C are partial fragmentary, perspective views of the inter-call receiver according to the embodiment of the present invention, respectively.
Figure 4B:
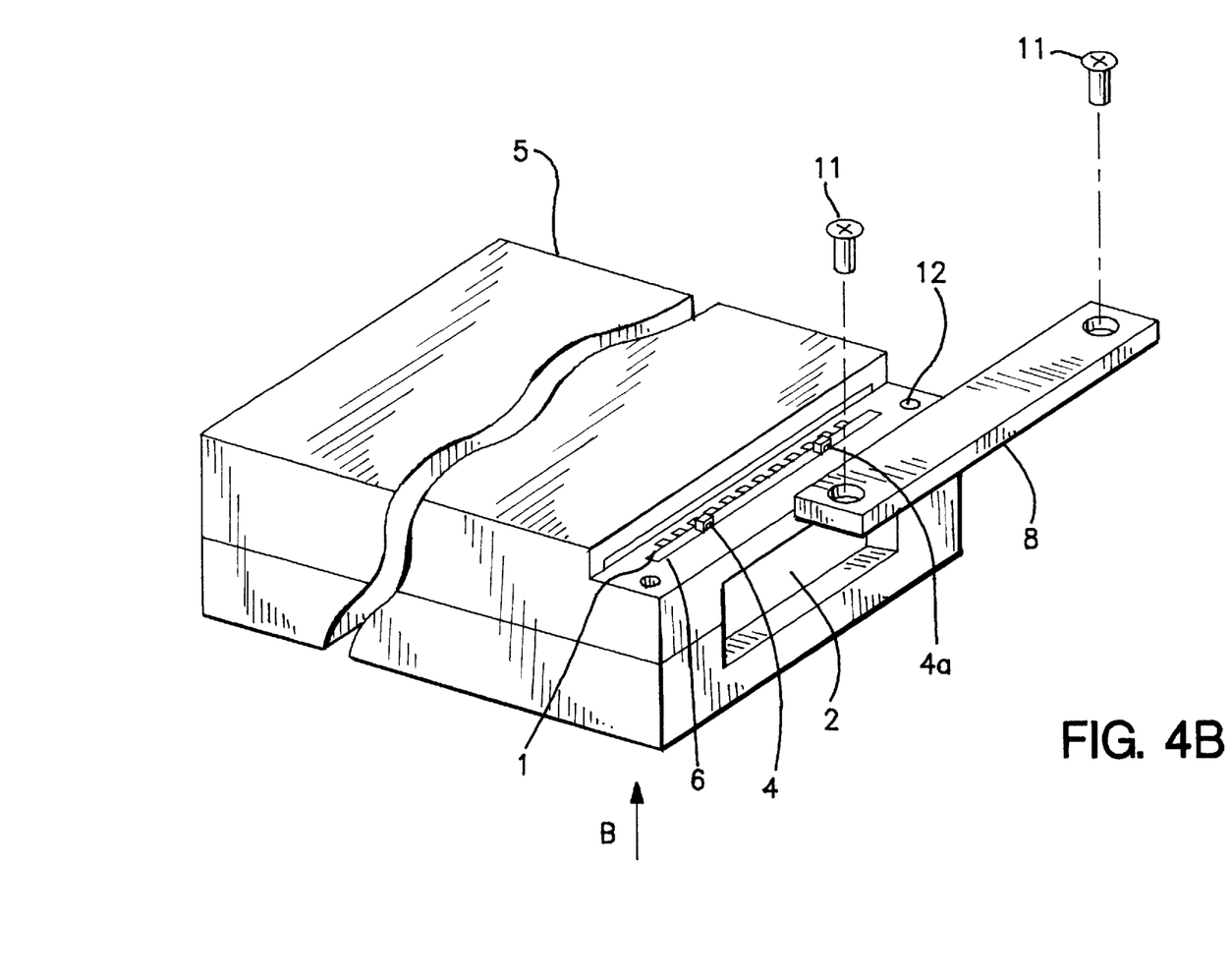
Figure 4C:
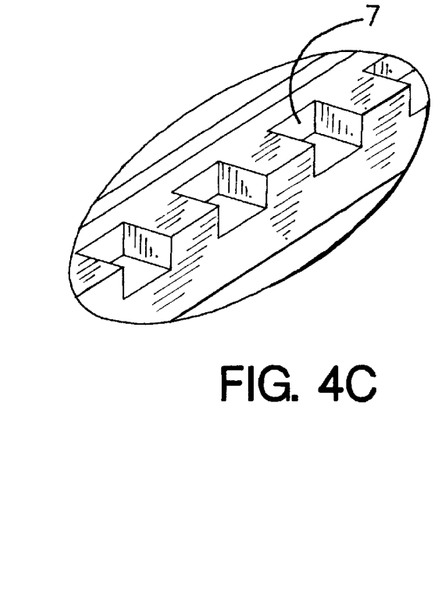
Figure 5:
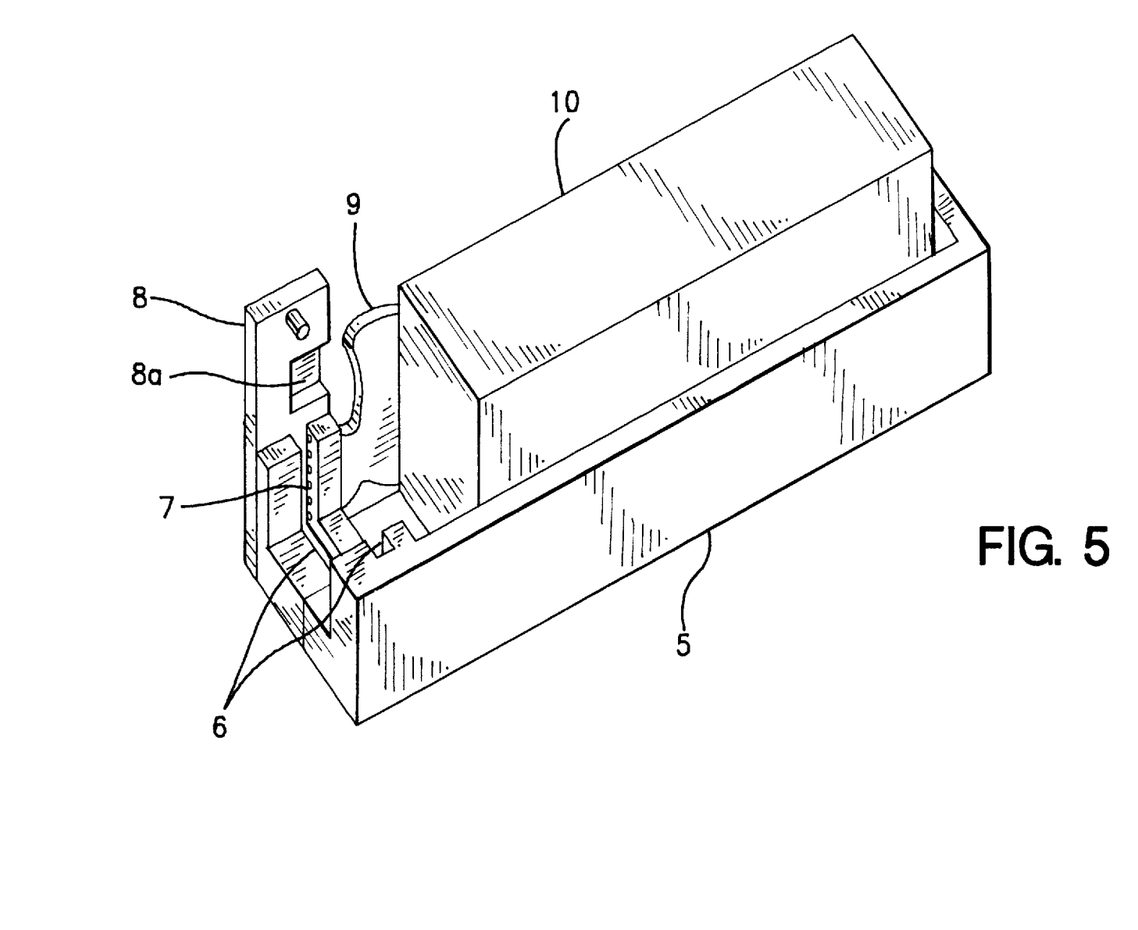
FIG. 5 is a partial fragmentary, perspective view of the embodiment of the present invention.

FIG. 4A, FIG. 4B, FIG. 4C and FIG. 5 illustrate the configuration of the case 5. The case is provided with a guide section 6 for insertion of the information display section 2. FIG. 4A illustrates the state of the information display section 2 when not inserted in the guide section 6, while FIG. 4B illustrates the state of the information display section 6 when inserted in the guide section 6. FIG. 4C is an enlarged fragment of FIG. 4A. FIG. 5 is a fragmentary perspective view of the case 5 when viewed along the direction indicated by the arrow B. As illustrated in FIG. 5, the guide section 6 is formed so as to insert and hold the information display section 2 in the case 5. The length of the guide section 6 is designed to match the length of the information display section 2 in the direction of its insertion. This guide section 6 is provided with connection terminals 7 for connection with the electrode terminals 3 of the information display section 2. In the present embodiment, the connection terminals 7 are shaped concavely to accommodate the convex-shaped electrode terminals 3. The connection terminals 7 may be flat in cases where the electrode terminals 3 are flat.

As shown in FIG. 4B, once the entirety of the information display section 2 is inserted in the guide section 6, the protruding sections 4 formed on the information display section 2 protrude from the surface of the case 5. Each of the protruding sections 4 has a through-hole 4a. A cover 8 is placed on the guide section 6, and fastened with screws 11 inserted in screw holes 12. The cover 8, provided with concave sections 8a matching the protruding sections 4 on its underside, may be fastened on the case 5 in a fitted manner.

As shown in FIG. 5, the connection terminals 7 formed in the guide section 6 extend to the underside of the guide section 6 and are connected to a flexible wiring section 9 by crimping, screwing, soldering or the like. The flexible wiring section 9 is connected to an electronic circuit section 10 in the case 5.

In order to insert the information display section 2 into the guide section 6 of the case 5, the insertion is performed in the direction indicated by the arrow A in FIG. 3A. As the information display section 2 is pushed into the guide section 6, the convex-shaped electrode terminals 3 come into contact with the connection terminals 7, thus establishing connections between the two counterpart terminals. Since the connection terminals 7 are connected to the electronic circuit section 10 via the wiring section 9, a connection between the information display section 2 and the electronic circuit section 10 is established.

The protruding sections 4 protrude from the guide section 6 even after the entire information display section 2 has been inserted in the guide section 6. However, since the concave sections 8a matching the protruding sections 4 are formed on the underside of the cover 8, the cover 8 may be threaded onto the guide section 6 from above by insert the screws 11 in the screw holes 12, thus firmly fastening the cover 8 on the case 5. The concave sections 8a matching the protruding sections 4 formed on the underside of the cover 8 may be omitted in cases where the vicinity of the guide section 6 is designed to be at a lower level than the other sections.

The information display section 2 may be removed from the guide section 6 as described below. First, the screws 11 are unscrewed to dismount the cover 5. Here, the protruding sections 4 of the information display section 2 protrude from the guide section 6. The information display section 2 may be removed by pulling out a pin or a piece of wire inserted in the through-hole 4a formed in each of the protruding sections 4. Alternatively, the information display section 2 may be removed by holding the protruding sections 4 between the fingers or with an appropriate tool.

Figure 6:
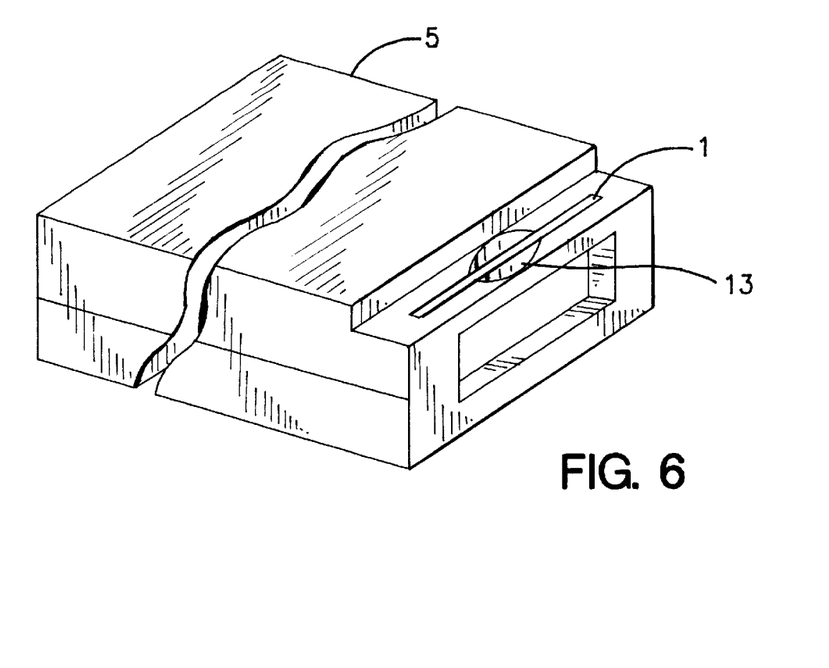
FIG. 6 is a perspective view of the outside of another embodiment of the present invention.
Figure 7:
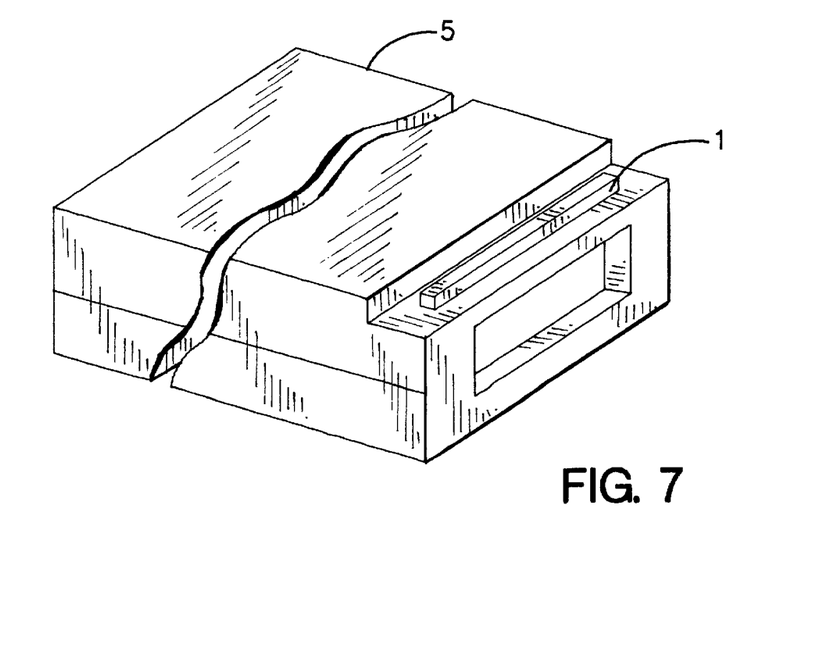
FIG. 7 is a perspective view of the outside of an additional embodiment of the present invention.

Other embodiments of the present invention are shown in FIG. 6 and FIG. 7. The cover 8, screw holes 12, etc. are not shown in these drawings. FIG. 6 illustrates a configuration where the guide section 6 for insertion of the information display section 2 is provided with a concave section 13 to facilitate removal of the information display section 2. The information display section 2 may be removed from the guide section 6 by inserting the fingers or an appropriate tool in the concave section 13 to hold the information display section 2. In FIG. 7, the length of the guide section 6 is designed to be shorter than the length of the information display section 2 in the direction of its insertion, with part of the information display section 2 protruding from the case 5. The information display section 2 may be removed from the case 5 by holding the protruding part with an appropriate tool. Here, the underside of the cover has a concave section formed to match the protruding part of the information display section 2.

With the configuration illustrated in FIG. 6 and FIG. 7, the electrode terminals 3 must be formed at locations on the information display section 2 which do not allow their contact with fingers and tools. Even in cases where this requirement is fulfilled, however, the periphery of the display panel is preferably provided with a resin frame.

The selective-calling receiver explained by way of the foregoing embodiments allows easy replacement of the failed display section alone, and thus the maintenance cost may be reduced accordingly.

Although the foregoing embodiments relate to cases of selective-calling receivers, it is obvious that the present invention may also be applied to other types of portable radio transmitters/receivers such as portable telephones which have the same or similar display sections.

While the present invention has been described in connection with certain preferred embodiments, it is to be understood that the subject matter encompassed by the present invention is not limited to those specific embodiments. On the contrary, it is intended to include all the alternatives, modifications, and equivalents as can be included within the spirit and scope of the following claims.

What is claimed is:

1. A radio device with a replaceable display section, comprising:

a removably replaceable display section comprised of a display panel for being visible at a front surface of the device, and an electrode terminal;

a guide section in a top surface of the device for inserting and holding said display section, wherein a portion of said display section protrudes above the top surface to facilitate removal of said display section when said display section is mounted in said guide section; and a connection terminal which is connected to the electrode terminal of said display section when said display section is mounted in said guide section.

2. A radio device as claimed in claim 1, wherein said protruding portion is on a side of the display section.

3. A radio device as claimed in claim 2, wherein said protruding portion is on a frame on a periphery of the display panel.

4. A radio device as claimed in claim 2, wherein said protruding portion comprises a through-hole.

5. A radio device as claimed in claim 1, wherein the top surface of the device adjacent said guide section has a concave section for facilitating removal of the display section.

6. The device of claim 1, wherein said display section is planar and said guide section comprises a slot for receiving said planar display section, and wherein said electrode terminal projects perpendicularly from said planar display section beyond said slot.

7. The device of claim 6, wherein said connection terminal comprises a recess in the surface of the device for receiving said perpendicularly projecting electrode terminal.

8. A radio device as claimed in claim 1, further comprising a cover to protect the guide section.

9. A radio device as claimed in claim 1, which is a portable radio transmitter/receiver, a front surface of which is provided with the display panel.

10. A radio device as claimed in claim 1, wherein the display panel is a liquid crystal display panel.

11. A radio device as claimed in claim 1, which is an selective-calling receiver.

12. A radio device as claimed in claim 1, which is a portable telephone.

13. A radio device with a removably replaceable display section, the device comprising:

a removably replaceable display section comprised of a protruding section on a side of said display section, a display panel on a front of said display section, and an electrode terminal;

a guide section in a surface of the device for inserting and holding said display section, said protruding section protruding from said guide section when said display section is mounted in said guide section; and a connection terminal that is connected to said electrode terminal when said display section is mounted in said guide section.

14. The device of claim 13, wherein said display section is planar and said guide section comprises a slot for receiving said planar display section, and wherein said electrode terminal projects perpendicularly from said planar display section beyond said slot.

15. The device of claim 14, wherein said connection terminal comprises a recess in the surface of the device for receiving said perpendicularly projecting electrode terminal.

16. A radio device with a removably replaceable display section, the device comprising:

a removably replaceable display section comprised of a display panel on a front of said display section, and an electrode terminal;

a guide section in a surface of the device for inserting and holding said display section, said guide section comprising a cavity in the surface of the device for facilitating removal of said display section when said display section is mounted in said guide section; and a connection terminal that is connected to said electrode terminal when said display section is mounted in said guide section.

17. The device of claim 16, wherein said display section is planar and said guide section comprises a slot for receiving said planar display section, and wherein said cavity straddles said slot so that said cavity is on both sides of a portion of said planar display section that projects into said cavity when said display section is mounted in said guide section.

* * * * *